United States Patent
Jibbe et al.

(10) Patent No.: US 8,615,640 B2
(45) Date of Patent: Dec. 24, 2013

(54) SYSTEM AND METHOD TO EFFICIENTLY SCHEDULE AND/OR COMMIT WRITE DATA TO FLASH BASED SSDS ATTACHED TO AN ARRAY CONTROLLER

(75) Inventors: Mahmoud K. Jibbe, Wichita, KS (US); Dhishankar Sengupta, Bangalore (IN); Arunkumar Ragendran, Bangalore (IN)

(73) Assignee: LSI Corporation, San Jose, CA (US)

(*) Notice: Subject to any disclaimer, the term of this patent is extended or adjusted under 35 U.S.C. 154(b) by 177 days.

(21) Appl. No.: 13/050,265

(22) Filed: Mar. 17, 2011

(65) Prior Publication Data
US 2012/0239857 A1    Sep. 20, 2012

(51) Int. Cl.
*G06F 12/04*    (2006.01)

(52) U.S. Cl.
USPC .............. 711/158; 711/103; 711/E12.008

(58) Field of Classification Search
USPC .................... 711/103, 114, 158, E12.008
See application file for complete search history.

(56) References Cited

U.S. PATENT DOCUMENTS

| | | | | |
|---|---|---|---|---|
| 8,423,710 | B1 * | 4/2013 | Gole | 711/103 |
| 2003/0145167 | A1 * | 7/2003 | Tomita | 711/114 |
| 2005/0144379 | A1 * | 6/2005 | Eschmann | 711/113 |
| 2008/0010398 | A1 * | 1/2008 | Jiang | 711/103 |
| 2008/0250195 | A1 * | 10/2008 | Chow et al. | 711/103 |
| 2008/0275928 | A1 * | 11/2008 | Shuster | 707/205 |
| 2009/0094433 | A1 | 4/2009 | Thomas et al. | 711/172 |
| 2009/0122949 | A1 * | 5/2009 | Reid et al. | 377/15 |
| 2009/0300277 | A1 | 12/2009 | Jeddeloh | 711/104 |
| 2010/0115175 | A9 | 5/2010 | Zhuang et al. | 711/103 |
| 2010/0169579 | A1 * | 7/2010 | Sheaffer et al. | 711/141 |
| 2010/0281230 | A1 * | 11/2010 | Rabii et al. | 711/165 |
| 2010/0306448 | A1 * | 12/2010 | Chen et al. | 711/103 |
| 2010/0318734 | A1 * | 12/2010 | Vaid et al. | 711/113 |
| 2011/0069526 | A1 * | 3/2011 | Schuette | 365/63 |
| 2011/0072192 | A1 * | 3/2011 | Sartore | 711/103 |
| 2011/0078393 | A1 * | 3/2011 | Lin | 711/155 |
| 2011/0202709 | A1 * | 8/2011 | Rychlik | 711/103 |
| 2011/0231598 | A1 * | 9/2011 | Hatsuda | 711/103 |

FOREIGN PATENT DOCUMENTS

WO   WO 2007/146756 A2   12/2007   .............. G06F 12/00

* cited by examiner

*Primary Examiner* — Hal Schnee
(74) *Attorney, Agent, or Firm* — Christopher P. Maiorana, PC

(57) ABSTRACT

An apparatus comprising a controller and an array. The controller may be configured to generate control signals in response to one or more input requests. The array may comprise a plurality of solid state devices. The solid state devices may be configured to (i) read and/or write data in response to the control signals received from the controller and (ii) distribute writes across the plurality of solid state devices such that each of said solid state devices has a similar number of writes.

11 Claims, 5 Drawing Sheets

THE BLOCK IDENTIFIER BITS ARE N BITS WIDE WHERE $2^n$ = TOTAL NUMBER OF BLOCKS IN A DEVICE

142

| STANDARD CACHE ATTRIBUTES | < EXTENDED ATTRIBUTES > |
|---|---|
|  |  |
| LBA AAAA    <DATA> | 111111111 |
| LBA 2456A   <DATA> | 111110000 |
| LBA 7       <DATA> | 000000101 |
| LBA 1011F   <DATA> | 000001111 |
| LBA FFFFD   <DATA> | 110101010 |
| ………. | ………. |
| ………. | ………. |
| ………. | ………. |
| ………. | ………. |

FIG. 4

SYSTEM AND METHOD TO EFFICIENTLY SCHEDULE AND/OR COMMIT WRITE DATA TO FLASH BASED SSDS ATTACHED TO AN ARRAY CONTROLLER

FIELD OF THE INVENTION

The present invention relates to storage devices generally and, more particularly, to a method and/or apparatus to efficiently schedule and/or commit write data to flash based SSDs attached to an array controller.

BACKGROUND OF THE INVENTION

Conventional flash based Solid State Devices (SSDs) provide a persistent medium like Hard Disk Drives (HDDs) to store data. SSDs that have no mechanically moving parts tend to have improved yields and/or different performance characteristics from HDDs. SDDs are typically not commonly deployed in enterprise configurations due to the high cost per unit data density. However, in recent years there has been increased adoption of SSDs in enterprise storage configurations that handle high performance workloads.

A conventional SSD used as a storage device can be made from multiple flash packages that are connected to a controller. Read/Write performance characteristics of flash based SSDs vary. A read/write to a 2 GB SSD flash is performed at a page level granularity. A read to a page (i.e., ⅘ contiguous blocks) is a low latency operation (i.e., ~25 μs), which is less than the latency of a HDD. A write to an empty page is a program only operation (~300 μs). A re-write to a page is a sequence of an erase operation, than a program operation. After a physical page is written, the page is erased before any subsequent writes. An erase operation cannot be performed at a page granularity. Rather, an erase is performed at a block level. A block erase operation takes about 2 ms.

Over time, the SSD media will eventually run out of adequate free blocks as the data grows and becomes scattered across the blocks. Lack of free blocks can cause multiple re-writes, which in turn creates multiple blocks of erase and program operations. Write throughput falls over time. Most of the writes to a page or a partial page (even a byte of data in a page) would result in erase (block) and program (page) sequences, resulting in very high write latency.

The above phenomena can be detrimental to the write endurance limit of the flash drives. In large enterprise implementations, data workloads are committed to the disk in a small window of time. The SSD media firmware can commit data irrespective of size or block affinity, resulting in numerous low efficiency writes (i.e., partial page of data commit in a largely filled flash device).

It would be desirable to implement a controller to rank or prioritize the pending data commits to a SSD to achieve optimal efficiency at each transaction. It would also be desirable to complete high efficiency writes before low efficiency writes, to implement a controller that does not allow high efficiency writes to lag low efficient writes and to achieve high write throughput per unit of time.

SUMMARY OF THE INVENTION

The present invention concerns an apparatus comprising a controller and an array. The controller may be configured to generate control signals in response to one or more input requests. The array may comprise a plurality of solid state devices. The solid state devices may be configured to (i) read and/or write data in response to the control signals received from the controller and (ii) distribute writes across the plurality of solid state devices such that each of said solid state devices has a similar number of writes.

The objects, features and advantages of the present invention include providing a system and method to efficiently schedule and/or commit write data to flash based Solid State Drives (SSD) attached to an array controller that may (i) define a mechanism by which an array controller leverages partially, specific physical attributes of the underlying SSD media and still preserve the Logical Block Addressing (LEA) method of traditional disks, (ii) provide array controller firmware to establish a mirrored copy of the mapping table from the underlying media, (iii) create and update the mirrored mapping table asynchronously, (iv) add extended bits to every cache write entry that is pending commit/flush to the disk, (v) provide a controller cache that may create a rank table that assists the cache/flush commit logic in scheduling data flush/commit to the disk, (vi) provide a cache flush logic, which acts as a second level cache, schedules commit/flush of LBA data from the controller cache to the disk based on rank table in order to eliminate the transition to a potential steady state, (vii) provide background array function that maintains and manipulates the rank table based on pending or completed commit/flush of LBA data, (viii) prioritize high efficiency data writes over low efficiency writes to the SSD disk, (ix) provide cache controller firmware groups LBA writes based on common blocks achieving better write efficiency per Write operation, and/or (x) not alter or divert the Core Cache management logic of the firmware, while allowing additional logic to be run as a low overhead child process spawned by the core logic.

BRIEF DESCRIPTION OF THE DRAWINGS

These and other objects, features and advantages of the present invention will be apparent from the following detailed description and the appended claims and drawings in which:

FIG. 4 is a diagram illustrating a data structure.

DETAILED DESCRIPTION OF THE PREFERRED EMBODIMENTS

The present invention may apply to NAND-Flash, NOR-Flash, or other Solid State Devices (SSDs). NAND-Flash may be more prevalent in enterprise storage configurations due to the high density. The present invention may schedule and/or commit data to a SSD disk (or an array of SSD disks) from an array controller during a real time transfer of data. Known limitations in addressing SSD based storage drives may be minimized.

Writes to a SSD media is potentially a high latency operation. Each write to a SSD may be implemented as a sequence of a block erase operation, followed by programming operation. The write latency becomes higher over time as most of the flash storage space gets used. A SSD drive has limited number of writes (e.g., 100,000+ writes). Before becoming unusable. A HDD (Hard Disk Drive) does not have such write limitations. There is a need to minimize the number of program/erase sequences during a write to a particular location of a SSD.

In a Network Attached Storage (NAS) and Storage Area Network (SAN), Redundant Array of Independent Disks (RAID) controllers will normally operate a single active firmware. Such controller firmware controls the product features, functionalities and/or third party vendor components (e.g., HBAs, HBA adapter drivers, failover drivers, switches/firmware, routers, etc.). In general, RAID controller firmware may be considered the main block of a SAN, similar to the Operating System of a server. Controller firmware may also handle activities such as routing input/outputs to backend disks through various layers.

The present invention may (i) mirror a translation table from a SSD media to upper level controller logic, (ii) append physical attribute information of underlying SSD media to an array controller cache structure, (iii) use a rank table or scoreboard structure that includes the physical attributes of the underlying SSD media, (iv) group data to commit to a SSD disk based on physical attribute of underlying media, and/or (v) prioritize data to commit to a SSD disk based on physical attribute of underlying media.

Figure 1:
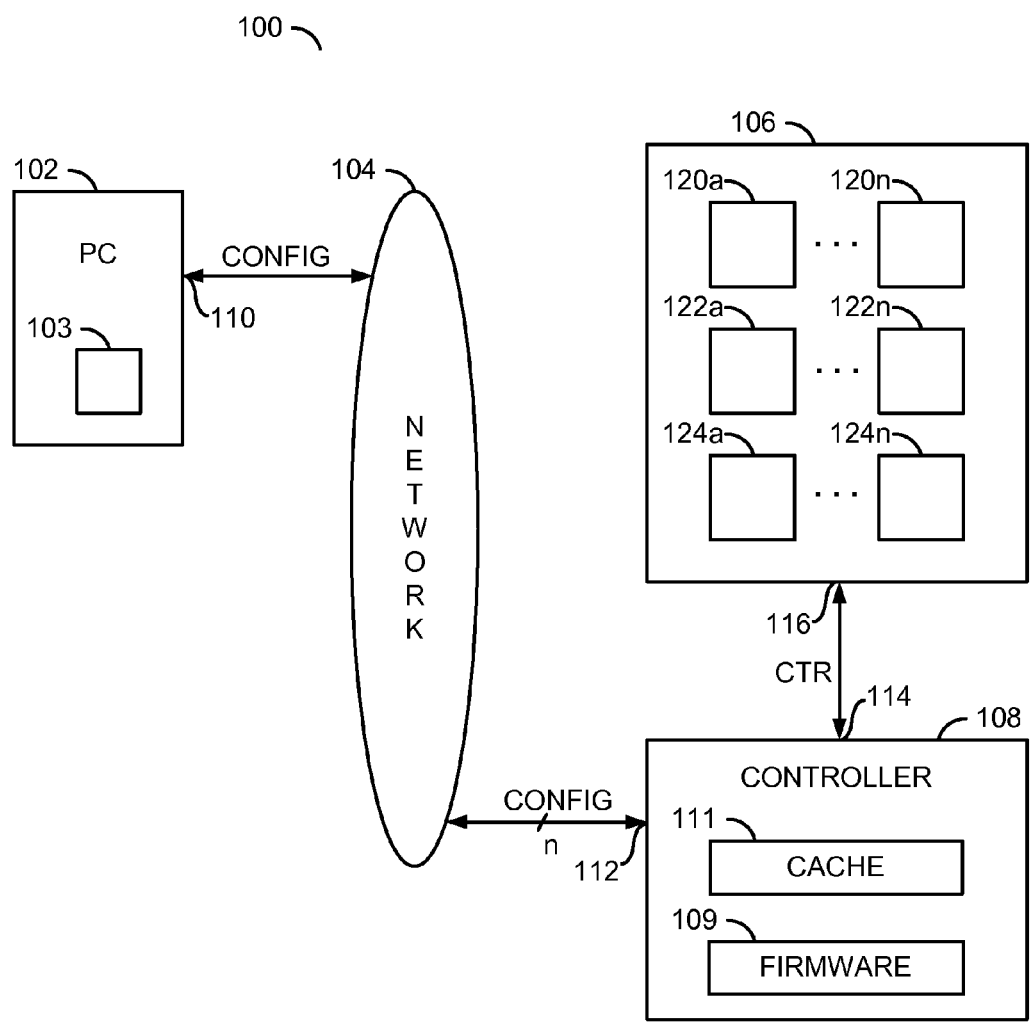
FIG. 1 is a block diagram illustrating a context of the present invention.

Referring to FIG. 1, a block diagram of a system 100 is shown illustrating a context of the present invention. The system 100 generally comprises a block (or circuit) 102, a network 104, a block (or circuit) 106, and a block (or circuit) 108. The circuit 102 may be implemented as a computer. The circuit 102 may include a program 103. The program 103 may be considered a host. The circuit 106 may be implemented as a number of storage devices (e.g., a storage array). The circuit 108 may be implemented as a controller. In one example, the circuit 108 may be a RAID controller. The controller 108 may include a block (or circuit) 109 and a block (or circuit) 111. The block 109 may be implemented as firmware that may control the controller 108. The block 111 may be implemented as a cache. The computer 102 may have an input/output 110 that may present a configuration file (e.g., CONFIG). The file CONFIG may be sent through the network 104 to an input/output 112 of the controller 108. The controller 108 may have an input/output 114 that may present a signal (e.g., CTR) to an input/output 116 of the storage array 106.

The storage array 106 may have a number of storage devices (e.g., drives or volumes) 120a-120n, a number of storage devices (e.g., drives or volumes) 122a-122n and a number of storage devices (e.g., drives or volumes) 124a-124n. In one example, each of the storage devices 120a-120, 122a-122n, and 124a-124n may be implemented as a single flash device, multiple flash devices, and/or one or more drive enclosures. In one example, each of the storage devices 120a-120, 122a-122n, and 124a-124n may be implemented as one or more non-volatile memory devices and non-volatile memory based storage devices (e.g., flash memory, flash-based solid state devices, etc.). The storage devices 120a-120n, 122a-122n, and 124a-124n may be implemented as a combination of HDDs and/or SSDs.

The present invention may change the logical flow and/or organization of an array controller firmware 109 that is driving a SSD or number of SSDs. In a typical operation, the array controller 108 may store every write operation from the host 103 in the internal (write-back) cache 111. A completion indication (or signal) may be sent before committing the data to the underlying media to mitigate the write latency. The data cache 111 may be flushed/committed to the disk media at a different time window based on an internal cache process. The cache 111 typically contains a Logical Block Address (LBA) identifier and the data to be committed.

The system 100 may mitigate the performance costs incurred over multiple writes. The ratio of updates to a block to the number of erase operations may be improved. The number of writes compared to the erase cost may be improved. The write endurance constraints may be reduced at a flash device (e.g., 120a-120, 122a-122n or 124a-124n). More than one write operation may be realized for a particular block at any given time. The number of block erase operations across a random set of data updated to the same block may be minimized. Low efficiency writes that slow down input/output cycles over high efficiency writes may be prevented by prioritizing the high ranked writes over the low ranked writes. A high ranked commit may have a higher number of data commits to the same block and thus higher efficiency.

The system 100 may augment media level write optimization techniques that may be implemented at the Flash Translation Level (FTL) level. The system 100 may mitigate throughput issues that occur over a period of time during random writes since media level optimizations may be ineffective in a SSD that is densely populated with data.

The firmware 109 may be designed without adding a significant cost overhead. Most of the added logic may be run as background process. The structures defined may be accessed in parallel by the added firmware components. The firmware logic 109 may scale to one or multiple devices by dynamically adding the required structures to the controller memory.

The controller cache 111 may be constrained in available space while adding additional data structures. The controller firmware 109 may enforce stricter partitioning of the available cache between read and write cache to minimize the overhead the additional logic adds. The firmware 109 may be designed to minimize frequent updates of the mapping/translation table at the FTL layer in underlying media.

The system 100 may be applicable to any storage topology where an array controller 108 is driving a SSD 108 or an array of SSDs in redundant form. The system 100 may mitigate the write bandwidth saturation during random writes. The controller 108 may comprise the built-in cache 111. The firmware 109 may be hosted using multi-core processors. The added logic defined may be spawned as multiple independent threads scheduled to run on independent CPU cores. The core logic of the controller 108 may be spared from overhead associated with the added logic.

Figure 2:
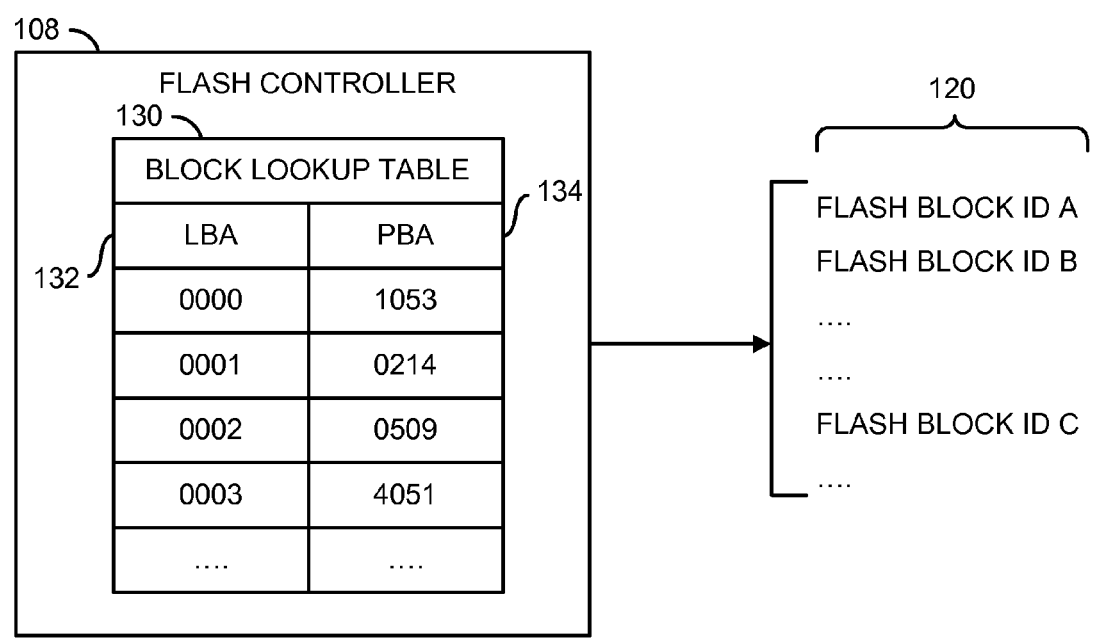
FIG. 2 is a block diagram of a flash controller.

Referring to FIG. 2, a block diagram of the drive array 106 and a storage device 120 is shown. The controller 108 may include a look-up table 130. The look-up table 130 may have a first column (132) that may reference logical block addresses (LBA). The second column (134) may reference physical block addresses (PEA). The block loop-up table 130 may be implemented as part of the firmware 109.

A background process may be created to setup a shadowed copy of the translation table 130 received from the underlying media 106. The controller 108 may setup multiple shadow copies while managing multiple flash devices. The translation table 130 may provide a data structure preserved by the flash translation layer of an underlying media that holds the mapping information between a Logical Block Address (LBA) and Physical Block Address (PBA).

The array controller firmware 109 may use the shadow copy of the table 130 to extract the block number from the PBA 134 corresponding to the LBA 132 (or a range) that are currently in the write cache 111 of the controller 108 waiting to be committed to the disk.

When the array controller 108 receives write input/output from the host 103, (and caches the data and/or sends the data to the host 103) the cache logic may create entries in the write cache 111 upon completion of a host write request. Another process, known as append logic, may perform the following (i) select a LBA/range of LBAs from the write cache 111, (ii) scan the shadow copy of the table 130 for matching the PBA 134 to extract the block number/ID information (as shown in FIG. 2), (iii) append the block number or ID as extended bits to the corresponding write cache entries, (iv) write to cache with the appended information (to be described in more detail in connection with FIG. 3 and FIG. 4).

Figure 3:
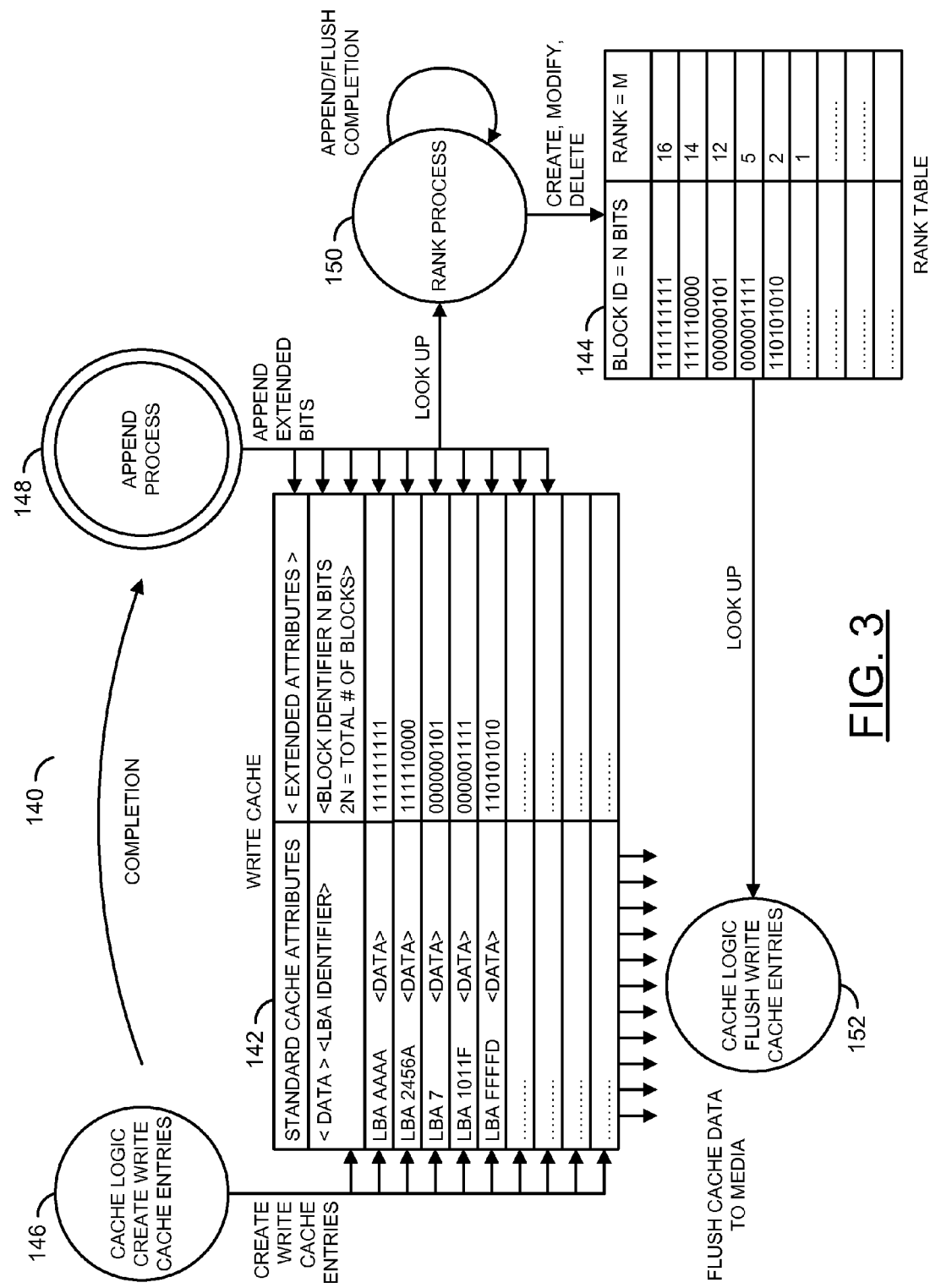
FIG. 3 is a data flow diagram.

Referring to FIG. 3, a data flow diagram 140 is shown. The data flog diagram may comprise a block 142, a block 144, a process 146, a process 148, a process 150 and a process 152. The block 142 may be implemented as a data structure. The block 144 may be implemented as a rank table. The process 146 may be implemented as a create process. During the process 146, cache logic may create write cache entries. The process 148 may be implemented as an append process. The process 150 may be implemented as a rank process. The process 152 may be implemented as a flush process. During the flush process 152, cache logic may flush write cache entries.

As the append process 148 is completed, the rank process 150 may be triggered to set up the rank table 144 in the controller memory (to be described in more detail in connection with FIG. 5). A simple tabular structure may have the block IDs from the extended attributes of the write cache 111 and the associated rank of the block ID in the write cache 111. The block ID with the highest number of write cache entries may be the highest ranked and entered in the top of the table 144.

Whenever the cache flush logic commits data to the SSD, the logic looks up the rank table 144 and starts the flush process 152. The flush process 152 may schedule the flush/commit of data to the media based on the rank. For example, the highest number of LBAs may be committed to Block ID A first, then the next highest, and so on. If there are multiple entries with a common rank, such entries may be scheduled arbitrarily based on whatever the core cache logic chooses to flush.

The rank process 150 may also add the entries in the rank table 144 when new cache entries are created. Extended bits may be appended by the append process 148. A completion indication may be sent to the rank process 150. The rank process 150 may also modify entries when the core cache logic flushes the cache line entries. For example, LBAs of a specific block ID may be fully flushed during the rank process 150 upon receiving the completion. The flush process 152 may evict the block ID or decrements the rank of the block ID if partial LBAs of the block are committed. Cache evicts are not considered, since such evicts are a function of the read cache logic.

Referring to FIG. 4, a block diagram of a data structure 142 is shown. The data structure 142 may comprise an extended write cache structure. The data structure 142 may be implemented as part of the cache 111. Extended bits may be added to an existing cache line entry in the write cache 111. The cache line entry may be defined using common attributes known in the art. Such attributes may include a unique LBA attribute, data to be committed as a basic criterion, etc.

The extended attributes may be block identifier bits that are fetched from the Physical Block Address 134 of a given LBA(s) 132. The extended attributes may be appended to the matching LBA(s) 132 in the cache line entries. A block of data in flash may hold multiple LBAs 132.

Figure 5:
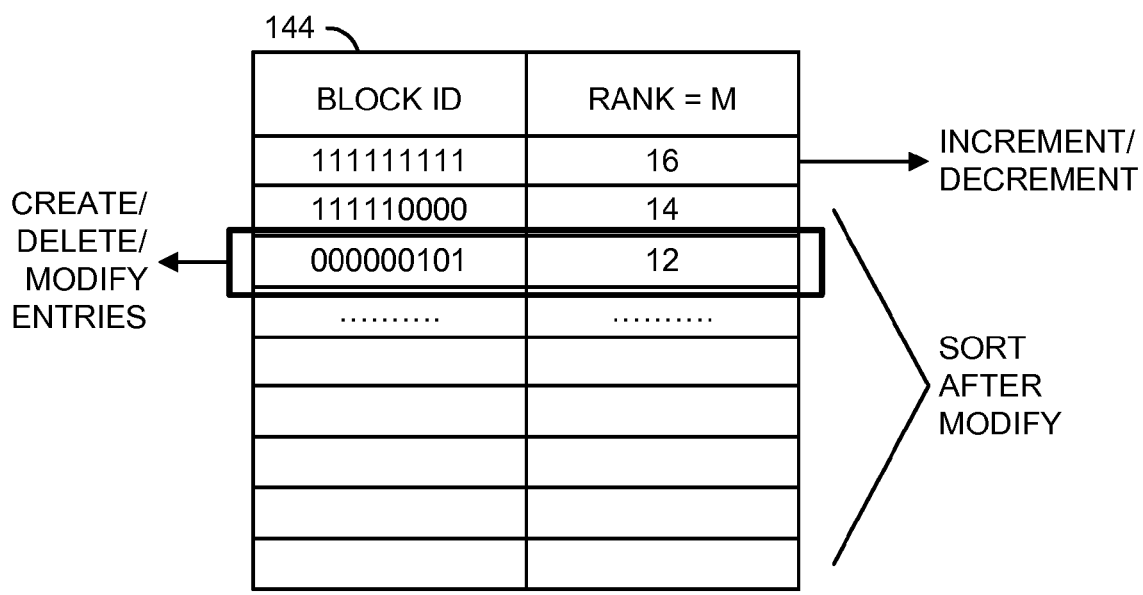
FIG. 5 is a diagram illustrating a rank table.

Referring to FIG. 5, a block diagram of the rank table 144 is shown. The rank table 144 may include the block ID bits (e.g., extended attributes from the cache) and a corresponding rank value. The rank table 144 entries may be created, modified and/or deleted by the rank logic. A modify operation may trigger a sort and/or rearrangement of the table 144 based on the rank values. In one example, the depth of the rank table 144 may be as long as the number of blocks in a system. The rank table 144 may dynamically grow and/or shrink as the entries are created and/or deleted. For example, the block ID bits may be n bits wide, where $2^n$=the total number of blocks in a device. The corresponding rank may equal the number of entries in write cache belonging to the particular block ID.

Consider an example of how the ranked commit versus non-ranked commit works from the cache 111 to the SSD media 106. In one example, the set of LBAs 132 and the cache 111 scheduled to commit to the SSD media 106 may be:
LBAs-<A000–A100h><Stored in Block C>Random LBAs–F0h, FFh<in Block D>LBAs–<C200–C100h><Stored in Block C.>

Whenever a page of a flash device (e.g., 120a-120n) needs to be overwritten, and no pre-erased page is available, the Flash Translation Layer (FTL) may perform the following operations (i) identify a block to erase, (ii) read all the valid pages (or initial valid data pages) from the block, (iii) erase the block, (iv) merge and program the changed pages, and (v) program the valid pages that were not changed.

In a typical scenario, cache logic may schedule the commits arbitrarily (the logic in the controller 108 may be unaware of the locality of data in flash). Therefore, unwanted erase program sequences in the SSD may occur.

The LBAs 132 written to Block C may trigger a sequence fetch and erase program operations, which would be added to the internal latencies of the SSD 120 due to copying and/or merging original data. There may also be data re-written to the Block D. The controller 108 may then commit the data Block C again. There may be a repeated block erase operation due to successive re-writes to the same block. The FTL may work around such re-writes by performing the Flash media specific operations described earlier. However, in a mostly filled SSD media, the re-writes (program and erase) may be difficult to contain.

The same commit of data may be altered in an efficient manner. The LBAs A000-A100 and C200-C100 may be common to Block C. The controller 108 may rank the LBAs higher in the rank table 144. When the cache flush/commit logic starts flushing the data to the disk, the logic may first commit all the data common to Block C (higher ranked). The cache flush/commit logic may then look up the rank table and then commit the data common to Block D. The number of re-writes per block may be minimized. Higher ranked writes may be prioritized before the lower ranked writes to achieve higher write throughput in a unit interval of time.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a controller configured to generate control signals in response to one or more input requests, said controller including a write-back cache; and
an array comprising a plurality of solid state devices, wherein said apparatus is configured to (i) read and/or write data in response to said control signals received from said controller, (ii) store all of said data in said write-back cache before writing to said array, (iii) provide a rank table to rank lines in said write-back cache from a most efficient write to a least efficient write based on a number of logical block addresses that are stored in each of said lines, (iv) store a copy of a mapping table for each of said plurality of solid state devices on said controller, and (v) distribute writes to a selected one or more of said plurality of solid state devices such that each of said solid state devices completes the most efficient write operation first by combining two or more of said writes when flushing data from said write-back cache to said selected solid state devices based on an indication of availability of storage space of said plurality of said solid state devices stored in said copy of said mapping tables and said rank table.

2. The apparatus according to claim 1, wherein said distribution of writes prioritizes real time writes over cache writes.

3. The apparatus according to claim 1, wherein said distribution of writes are grouped on said solid state devices based on physical attributes.

4. The apparatus according to claim 3, wherein said physical attributes of said solid state devices are appended to said write-back cache on said controller.

5. The apparatus according to claim 3, wherein said controller comprises a rank table structure with said physical attributes of said solid state devices.

6. The apparatus according to claim 5, wherein said rank table assists logic for scheduling said writes to said solid state devices.

7. The apparatus according to claim 1, wherein a translation table from said solid state devices is mirrored to controller logic on said controller.

8. The apparatus according to claim 7, wherein said controller creates multiple shadow copies of said translation table while managing said solid state devices.

9. The apparatus according to claim 7, wherein said translation table provides a data structure to hold mapping information between a Logical Block Address (LBA) and Physical Block Address (PBA).

10. An apparatus comprising an array of solid state devices, said apparatus comprising:
   means for generating control signals using a controller, in response to one or more input requests, said controller including a write-back cache;
   means for reading and/or writing data in response to said control signals;
   means for storing all of said data in said write-back cache before writing to said array;
   means for providing a rank table for ranking lines in said write-back cache from a most efficient write to a least efficient write based on a number of logical block addresses that are stored in each of said lines;
   means for storing a copy of a mapping table for each of said plurality of solid state devices;
   means for distributing writes to a selected one or more of said plurality of solid state devices such that each of said solid state devices completes the most efficient write operation first by combining two or more of said writes when flushing data from said write-back cache to said selected solid state devices based on an indication of availability of storage space of said plurality of said solid state devices stored in said copy of said mapping tables and said rank table.

11. A method of scheduling and/or committing data to an array comprising a plurality of solid state devices, comprising the steps of:
   (A) generating control signals in response to one or more input requests;
   (B) reading and/or writing said data in response to said control signals; and
   (C) storing all of said data in a write-back cache before writing to said array;
   (D) providing a rank table to rank lines in said write-back cache from a most efficient write to a least efficient write based on a number of logical block addresses that are stored in each of said lines;
   (E) storing a copy of a mapping table for each of said plurality of solid state devices;
   (F) distributing writes to a selected one or more of said solid state devices such that each of said solid state devices completes the most efficient write operation first by combining two or more of said writes when flushing data from said write-back cache to said selected solid state devices based on an indication of availability of said storage space of said plurality of said solid state devices stored in said copy of said mapping tables and said rank table.

* * * * *